(12) United States Patent
Christodorescu et al.

(10) Patent No.: US 7,739,737 B2
(45) Date of Patent: Jun. 15, 2010

(54) METHOD AND APPARATUS TO DETECT MALICIOUS SOFTWARE

(75) Inventors: Mihai Christodorescu, Madison, WI (US); Somesh Jha, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 1341 days.

(21) Appl. No.: 10/629,292

(22) Filed: Jul. 29, 2003

(65) Prior Publication Data
US 2005/0028002 A1 Feb. 3, 2005

(51) Int. Cl.
*G06F 11/00* (2006.01)
*G06F 12/14* (2006.01)
*G06F 12/16* (2006.01)
*G08B 23/00* (2006.01)

(52) U.S. Cl. .................. 726/24; 713/165; 713/187; 713/188; 726/26

(58) Field of Classification Search .................. 726/24
See application file for complete search history.

(56) References Cited

U.S. PATENT DOCUMENTS

| | | | |
|---|---|---|---|
| 6,357,008 B1 * | 3/2002 | Nachenberg | 726/24 |
| 6,594,783 B1 * | 7/2003 | Dollin et al. | 714/38 |
| 6,851,057 B1 * | 2/2005 | Nachenberg | 726/24 |
| 7,036,111 B2 * | 4/2006 | Dollin et al. | 717/126 |
| 7,069,589 B2 * | 6/2006 | Schmall et al. | 726/24 |
| 7,188,369 B2 * | 3/2007 | Ho et al. | 726/24 |

OTHER PUBLICATIONS

Christodorescu, Mihai, "Detecting Malicous Patterns in Executables via Model Cehcking", University of Wisconsin, Madison, Jul. 12, 2002, pp. 1-15.*
Christodorescu et al., "Static Analysis of Executables to Detect Malicous Patterns", University of Wisconsin, Feb. 2003, pp. 1-21.*

* cited by examiner

*Primary Examiner*—Michael Pyzocha
*Assistant Examiner*—Shewaye Gelagay
(74) *Attorney, Agent, or Firm*—Boyle Fredrickson, S.C.

(57) ABSTRACT

A technique for finding malicious code such as viruses in an executable binary file converts the executable binary to a function unique form to which function unique forms of virus code may be compared. By avoiding direct comparison of the expression of the viral code but looking instead at its function, obfuscation techniques intended to hide the virus code are substantially reduced in effectiveness.

14 Claims, 2 Drawing Sheets

METHOD AND APPARATUS TO DETECT MALICIOUS SOFTWARE

STATEMENT REGARDING FEDERALLY SPONSORED RESEARCH OR DEVELOPMENT

This invention was made with United States government support awarded by the following agency: NAVY/ONR N00014-01-1-0708. The United States has certain rights in this invention.

CROSS-REFERENCE TO RELATED APPLICATIONS

None.

BACKGROUND OF THE INVENTION

The present invention relates to computer programs and, in particular, to a computer program for detecting malicious programs such as computer viruses and the like.

In the interconnected world of computers, malicious programs have become an omnipresent and dangerous threat. Such malicious programs include "viruses" that are programs attached to other programs or documents that activate themselves within a host computer to self-replicate and attach to other programs or documents for further dissemination. "Worms" are programs that self-replicate to transmit themselves across a network. "Trojan horses" are programs that masquerade as useful programs but contain portions to attack the host computer or leak data. "Back doors" are programs that open a system to external entities by subverting local security measures intended to prevent remote access and control via a network. "Spyware" are programs that transmit private-user data to an external entity.

Methods for detecting malicious programs may be classified as dynamic or static. In dynamic methods, the suspected program is executed in a "sandbox". A sandbox is a safe execution area created in a computer that uses hardware and/or software to prevent the executing program from damaging interaction with the computer and to monitor attempts at such interaction, such as writing data outside of a predefined memory area.

Static detection does not require execution of the suspected program, but instead reads and analyzes the program instructions or "code" before it is executed. One "heuristic" detection technique looks for changes in certain program locations (normally the beginning and end of the code) where the virus is likely to be attached. A second "signature" detection technique checks for known virus-specific sequences of instructions (virus signatures) inside the program. Such signature detection is effective when the virus does not change significantly over time and when multiple viruses have the same signature.

Viruses may disguise their signature by encrypting themselves using a changing encryption key so that the encrypted viral code is always different. In this case, the signature detection may be directed to signatures in unvarying decryption programs. Another method of detecting encrypted viruses executes the programs in a sandbox until they are decrypted and then detects the decrypted virus using conventional static techniques of signature analysis. This technique requires frequent scanning of the in-memory image of the program while the program executes.

Many signature-detection systems may be defeated by relatively simple code obfuscation techniques that change the signature of the virus or the decrypting code without changing the essential function of the code. Such techniques may include changing the static ordering of the instructions using jump instructions (code transposition), substituting instructions of the signature with different synonym instructions providing the same function, changing the registers used by the viral code, and the introduction of code ("dead code") that does not modify the functionality of the virus.

Simple obfuscation may be countered by more complex search instructions, "regular expressions" that ignore simple dead code like no-op instructions at instruction boundaries. Also new signatures can be developed for each different obscured version of the viral code.

More complex metamorphic viruses may evade these more sophisticated signature detection systems by changing the obfuscation specifics as the virus is propagated. Such viruses may weave the viral code into the host program, also defeating the traditional heuristic approach to finding the virus.

SUMMARY OF THE INVENTION

The present invention provides an ability to detect obfuscated malicious code signatures by effectively implementing high level "function" signatures describing the function of the malicious code rather than its "expression" as a string of instructions. This functional analysis is made possible by a preprocessor that converts the program instructions into a standard form denoting their function. A search of the standard form of the suspect program for viral signatures in standard form is then used to detect the malicious code.

Specifically, the present invention provides a computer program for identifying malicious portions in a suspect program. The computer program comprises a preprocessor portion for receiving a suspect program and creating a logically equivalent standardized version of the program. A detector portion of the computer program reviews the standardized version of the suspect program against a library of standardized malicious code portions to provide an output indicating when a malicious code portion is present in the suspect program.

It is thus one object of the invention to provide a method of detecting malicious code portions that is largely indifferent to the expression of the malicious code but is instead sensitive to the function of the malicious code. This functional analysis is done by converting varying expressions into a standardized form prior to application of signature analysis.

The standardized version of the suspect program may identify the execution order of instructions, and the detector portion may review the instructions of the standardized version according to the execution order.

Thus, it is another object of the invention to provide a detection system that is largely indifferent to code transposition.

The preprocessor may identify the execution order of the instructions by generation of a controlled flow listing of the instructions.

Thus, it is another object of the invention to provide a detection system that can exploit conventional tools and techniques used for program analysis.

The standardized version may map instructions of the suspect program to corresponding standard synonym instructions.

Thus, it is another object of the invention to provide a unique functional expression of code that may be used to provide effective functional analysis.

The standard synonym instructions may be different in number from the instructions of the suspect program to which the synonym instructions map.

Thus, it is another object of the invention to provide for a translation of different implementations of the same function when those different implementations may be expressed in different numbers of instructions.

The standardized version may remove non-executing program portions. This may be done by actually removing the portions or tagging them so the detector ignores them.

Thus, it is another object of the invention to provide a system for detecting malicious code that is largely indifferent to dead code insertion.

The standardized version may use uninterrupted variables, that is, variables not tied to a particular memory location or register.

Thus, it is another object of the invention to decrease the sensitivity of the invention to particular register or memory locations such as are related to expression rather than function of the code.

The suspect program may be a binary executable, and the preprocessor portion may receive the binary executable to generate a listing of instructions and data values.

Thus, it is another object of the invention to provide a system that works with binary executables as is typically the form in which infected programs are received.

The program may include a library of patterns matching to one or more instructions of the suspect program, and the preprocessor may create the standardized version by replacing instructions of the suspect program with matching patterns. The library of standardized malicious code portions may also be collections of these patterns. Generally, a pattern may be at least one instruction logically replacing one or more corresponding instructions in the suspect program to perform the same logical function, or may be a tag replacing one or more instructions having no substantive effect in the execution of the program.

Thus, it is another object of the invention to provide a simple mechanism for generating a standardized version that may be readily supplemented as new functional equivalents or methods of obfuscation are discovered or developed.

A library of patterns may be implemented as a simple look-up table.

Thus, it is another object of the invention to provide a mechanism that may be easily augmented and simply implemented.

The detector portion may output a representation of the malicious code portion when the malicious portion is present in the suspect program.

Thus, it is another object of the invention to provide a detection system that may be easily added to other detection systems for further analysis of the identified malicious code portion.

These particular objects and advantages may apply to only some embodiments falling within the claims and thus do not define the scope of the invention.

DETAILED DESCRIPTION OF THE PREFERRED EMBODIMENT

Figure 1:
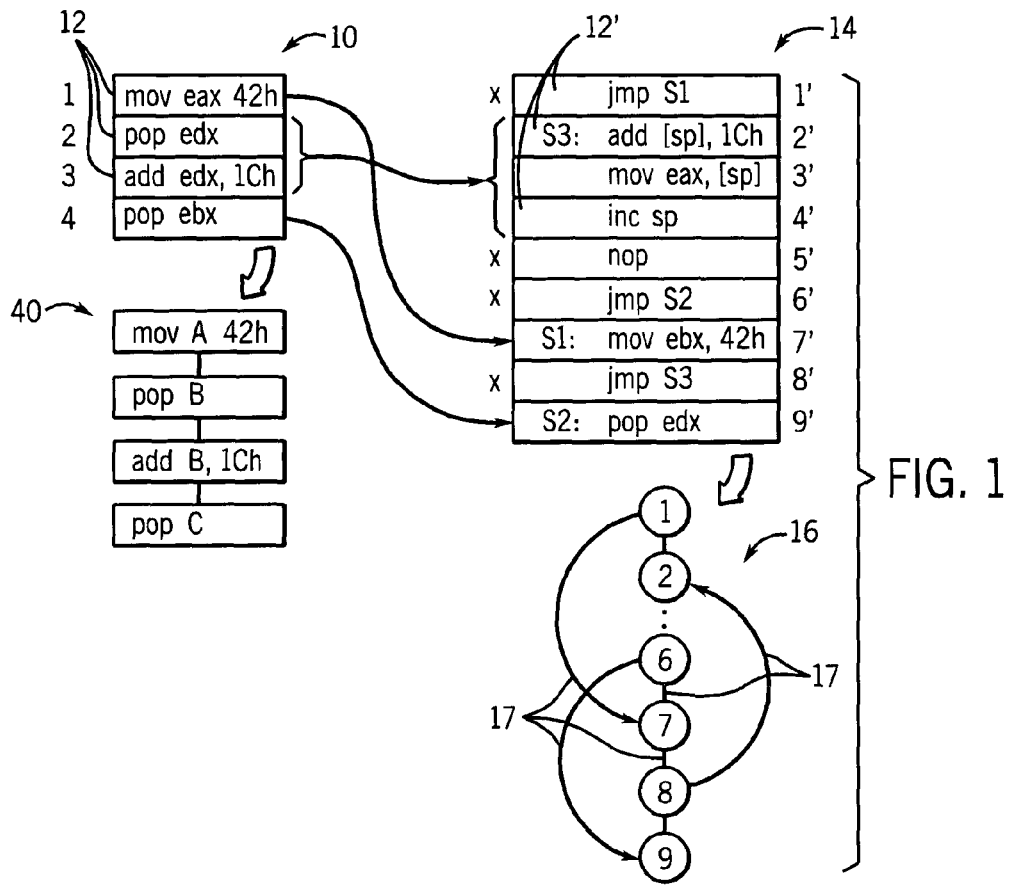
FIG. 1 is a diagram showing instructions of a portion of malicious code as extracted to a standardized malicious code pattern and as obfuscated using a variety of techniques of code transposition, instruction synonyms, register reassignment, and insertion of dead code.

Referring now to FIG. 1, raw code 10 from a malicious program will be comprised of instruction lines 12 of instructions and/or data. The instruction lines 12 are typically part of a binary executable but are shown in FIG. 1 in their source code representation for clarity. Generally, the binary data of the raw code 10 creates a pattern that may be recognized by a standard virus detection program using signature detection.

In the example of FIG. 1, the first instruction line, labeled (1), includes a mov instruction that moves the constant 42h (hexadecimal) to the eax register of the computer. The second instruction line (2) includes a pop instruction that takes data off the computer stack and places it in the edx register. Third instruction line (3) provides an add instruction that adds the contents of the edx register (previously loaded by the second instruction line) to the constant 1Ch. Finally, the fourth instruction line provides another pop instruction taking the top value of the stack and placing it in the ebx register. The example raw code 10 is not intended to represent a portion of any particular malicious program but provides examples of the sorts of instructions of which viruses and other malicious code may be constructed.

The raw code 10 may be converted to obfuscated code 14 by a number of techniques. First, instruction lines may be replaced with different instruction lines providing the same function (synonym instructions), and registers may be reassigned, meaning that the same values are computed but stored in different registers. For example, instruction lines (2) and (3) of the raw code 10 may be replaced with synonym instruction lines (2'), (3'), and (4') of the obfuscated code 14. New instruction line (2') provide an add instruction adding the hex value of 1 Ch to the top of the stack. Instruction line (3') provides a mov instruction moving the value in the top of the stack to register eax and instruction line (4') provides an inc instruction incrementing the stack pointer.

The end computational result of instruction lines (2') to (4') of obfuscated code 14 is the same as that of instruction lines (2) and (3) of the raw code 10: a sum of the top value of the stack and 1 Ch. For the obfuscated code 14, the register holding this value is eax while for the raw code 10, the register holding this value is edx, a change that has no functional significance so long as the subsequent portions of the program using this value also have had their registers reassigned to look for it in register eax. Other register reassignments replace registers eax and ebx in the raw code 10 with ebx and edx, respectively, in the obfuscated code 14.

The raw code 10 may be further obfuscated by the addition of a number of jmp instructions at instruction lines (1'), (6') and (8') which, by causing jumps in the execution order of the instruction lines 12' of the obfuscated code 14, allow the function of instruction line (1) of the raw code 10 (instruction line (7') in the obfuscated code 14) to be placed after the functions of instruction lines (2) and (3) (instruction lines (2')-(4') in the obfuscated code 14) in the static ordering of the instruction lines 12. Specifically, instruction line (1') of the obfuscated code provides a jmp instruction causing the executing program to jump to label S1 (instruction line (7'). Succeeding instruction line (8') provides a jmp instruction ausing a jump to label S3 (instruction line (2'). Instruction line (6') provides a jmp instruction causing a jump to label S2 (instruction line (9'), the final instruction in the obfuscated code 14. A static-ordered listing 16 of obfuscated code 14 shows the twisted execution thread 17 caused by these jumps. This code transposition does not affect the function of the obfuscated code 14, but changes the static ordering of the instruction lines 12' defeating simple signature detection techniques which read the instruction lines in static order.

Finally, the raw code 10 may be obfuscated by the addition of nonfunctional instruction lines, in this example a nop (no operation) instruction at instruction line (5'). More generally, a non-functional instruction line may include instructions that execute, but that could be removed with no effect on the core function of the obfuscated code 14, for example, incrementing of a variable followed immediately by decrementing the same variable or multiple successive reads or writes of the same variable, or computations, the results of which are never used.

Figure 2:
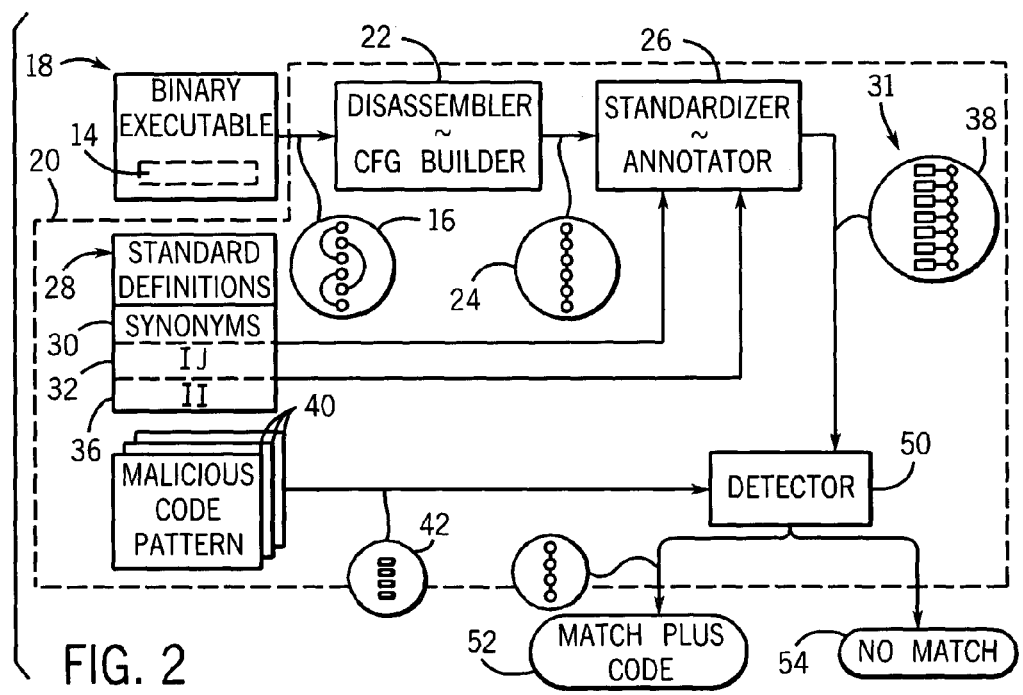
FIG. 2 is a block diagram of the principle functional blocks of the present invention showing receipt of a binary executable and its analysis against a library of standard malicious code patterns.

Referring now to FIG. 2, a binary executable 18, possibly including the obfuscated code 14, may be received by the malicious code detection program 20 of the present invention. The binary executable 18 is loaded into a disassembler/control-flow graph builder 22, the disassembler portion of which, having a priori knowledge of the particular instruction set of the binary executable 18, produces a listing of instruction lines distinguishing instructions and data per a static-ordered listing 16. The execution order of the disassembled instructions may be determined by an emulation of the control flow of the instructions by a control-flow listing (CFG) builder to produce an execution-ordered listing 24. The execution-ordered listing 24 indicates the execution order of the instruction lines 12 by reordering the instruction lines 12 or by tagging them with execution order information. Conditional jumps become execution ordered branches (not shown).

Disassemblers for this purpose are well known in the art, and in a prototype of the present invention, the IDA PRO™ interactive disassembler commercially available from Data Rescue of Liège, Belgium (www.datarescue.com) is used. The execution-ordered listing 24 may be produced using CodeSurfer™ by GrammaTech, Inc. of Ithaca, N.Y. (www.grammatech.com). CodeSurfer™ provides an application programmer interface (API) that may be used with a custom programming written in C Language.

The data of the control flow listing 24 is passed to a standardizer/annotator 26 written in C using the Code Surfer API which completes a standardized version 31 of the instruction lines 12' of the execution-ordered listing 24 which have already been arranged in standard execution order. For the completion of the standardized version 31, the standardizer/annotator 26 receives a set of standard definitions 28 including a list of instruction synonyms 30, irrelevant jump patterns 34, and irrelevant code patterns 32.

Figure 3:
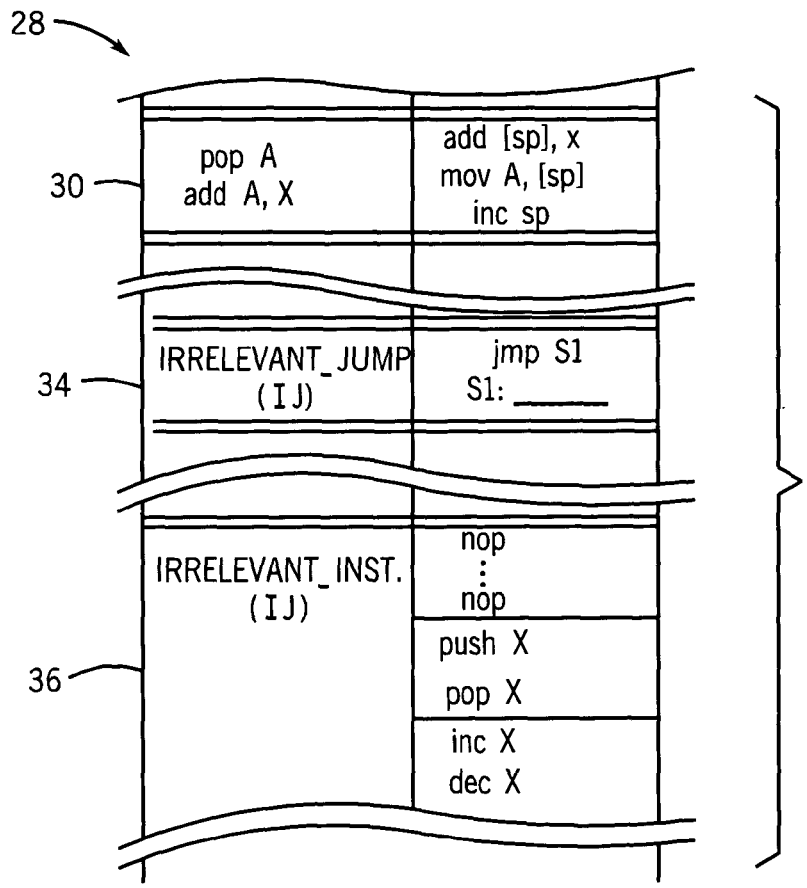
FIG. 3 is a graphical representation of a standard synonym table used to convert the binary executable of FIG. 2 to a standardized version.

Referring now to FIG. 3, instruction synonyms 30 of the standard definitions 28 may be held in tabular form with a right column providing instruction lines 12' such as might be found in the obfuscated code 14 with the data portions (references to pointers and variables) being in the form of uninterpreted placeholder symbols and the left column providing a standard representation (in different instruction lines 12) of the function provided by the instruction lines 12'. Thus, for example, the left column instruction lines:

pop A
add A, X serve as a standard representation for the instructions:

add [sp],X
mov A [sp]
inc sp found in the right column. In general, multiple left column patterns will map to a single right column pattern.

The standardizer/annotator 26 reviews the execution-ordered listing 24 for the left column patterns of the standard definitions 28 and tags them with the corresponding right column patterns to create annotated control flow listing 38 providing a standardized version 31 of the instruction lines 12' of the execution-ordered listing 24. The matching done by the standardizer/annotator 26 ignores the particular data references (e.g. whether the data is being put in register eax vs. edx), but looks for local consistency within the pattern (e.g., a register A of the right column pattern maintains a consistent mapping to the actual register of the corresponding instruction lines 12' of the execution-ordered listing 24). Note that constants survive this process, in this example, constant 42h and 1Ch hex.

Figure 4:
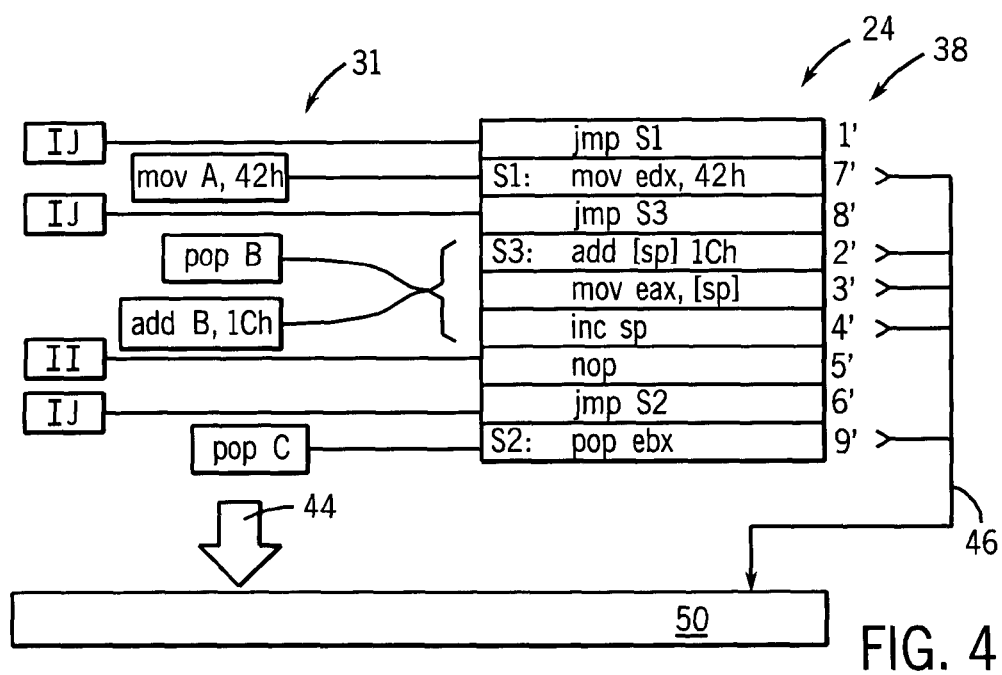
FIG. 4 is a diagram similar to that of FIG. 1 showing the obfuscated program of FIG. 1 annotated per the present invention to be received by the detector of FIG. 2.

As shown in FIG. 4, the actual instructions of the execution-ordered listing 24 are preserved, and the replacement operation to produce a standardized version 31 of the obfuscated code 14 is done by adding tags to the instruction lines 12' of the obfuscated code 14 so absolute data references are not lost.

Returning to FIG. 3, irrelevant jump patterns 34 (code transposition) are also identified as part of the standard definitions 28 and held in tabular form with a right column providing instruction lines 12' that produce irrelevant jumps and the left column providing for a standard tag indicating that the instruction lines 12' may be ignored. In the execution-ordered listing 24, irrelevant jump patterns 34 are easily recognized as jumps to the next instruction illustrated in FIG. 4 by instruction line (8') showing a jump to label S3 of instruction line (2') the next instruction line in execution order. Here, the labels (e.g. S1-S-3), like the variables above, are uninterpreted and the matching done by the standardizer/annotator 26 accepts any label name that provides a jump to the next instruction.

The standard definitions 28 may also identify irrelevant instruction patterns 36, being broadly instruction lines 12' that could be eliminated without affecting the underlying function of the obfuscated code 14. Patterns of irrelevant instructions are held in the tabular form of the standard definitions 28 with a right column providing instruction lines 12' that might be found in the obfuscated code 14 and the left column providing for a standard tag indicating that the instruction lines 12' may be ignored. A large number of irrelevant instruction patterns 36 are possible and the table of the standard definitions 28 may be easily updated. Some example irrelevant instructions are one or more nop instructions, a push instruction for a variable followed immediately by a pop instruction for the same variable, an inc instruction for a variable followed by a dec instruction for the same variable.

Referring to FIGS. 2 and 3, the standardizer/annotator 26 matches the instructions of the left hand column of FIG. 3 for irrelevant instruction patterns 36 and irrelevant jump patterns 34, to the instructions of the execution-ordered listing 24 and annotates the resulting code as indicated by annotated control flow listing 38. The annotation process preserves the actual interpreted variables as may be used in the next step.

Referring again to FIG. 1, particular raw code 10 of a number of malicious programs are abstracted to malicious code pattern 40 using the same techniques described above so that the malicious code patterns are in a standard version comparable to standardized version 31. This standardization may be done by providing the raw code 10 to the disassembler/control-flow graph builder 22 and standardizer/annotator 26 to order the instruction lines 12 according to their execution order, eliminate nonfunctional code, convert all instruction synonyms to a standard version and abstracting variables and registers. The malicious code patterns 40 are stored in tables that may be updated like the tables for the standard definitions 28 as new malicious programs and/or obfuscation techniques are developed.

Referring now to FIG. 4, the annotated control flow listing 38, following the example of FIG. 1, has ordered the instruction lines 12' in their execution order of (1), (7), (8), (2), (3), (4), (5), (6), and (9). Instructions (1') and (8') and (6') have been identified as irrelevant jumps since they jump now to the instruction immediately succeeding the jump instruction. Instruction (5') is identified as an irrelevant instruction from the list of FIG. 3. Instruction (7') has been tagged in a standard form as mov A, 42h. Likewise, instructions (2')-(4') have been tagged as pop B and add B, 1 Ch using the relationships of the standard definitions 28 of FIG. 3, and instruction (9') has been abstracted as pop C.

Referring also to FIGS. 1 and 4, the standardized version 31 of the synonyms without the irrelevant instructions and the irrelevant jumps are forwarded to the detector 50, as indicated by arrow 44, along with their associated instruction lines 12', as indicated by arrow 46. The detector 50 also receives the malicious code patterns 40 and performs a string comparison operation searching for the malicious code patterns 40 in the standardized version 31 with the data references as implicit wildcards.

If a match occurs, the actual registers and variables associated with the standardized version 31 per associated instruction lines 12 of the annotated control flow listing 38 are analyzed to see if they provide the same relative data flow paths required of the matching malicious code pattern 40.

If a match is confirmed at this stage, then the instruction lines, in this case (7'), (2'), (3'), (4') and (9'), may be output as indicated by state 52, indicating there has been a match, plus providing the actual instruction lines 12 for possible additional analysis.

Alternatively, if no match is obtained, that is indicated by state 54.

The present invention may be used with dynamic techniques, in which a malicious program is executed or emulated to decrypt and the invention applied to the decrypted malicious code. The present invention may also be applied to malicious code that is woven into another program. In this case, the malicious code will be rendered visible by the disassembler/control-flow graph builder 22.

The present invention may be used also with systems that initially inspect an executable binary for viruses and then create a hash of that inspected executable for subsequent high-speed comparison of its integrity without the need to execute the malicious code detection program 20 again.

It is specifically intended that the present invention not be limited to the embodiments and illustrations contained herein, but include modified forms of those embodiments including portions of the embodiments and combinations of elements of different embodiments as come within the scope of the following claims.

We claim:

1. A computer program stored on a computer readable hardware storage medium for identifying malicious portions in a suspect computer program comprising:
    a preprocessor portion for receiving the suspect computer program in executable form and creating a logically equivalent standardized version also in executable form of the suspect program without executing the suspect program, the logical equivalent standardized version if executed providing an equivalent result as execution of the suspect computer program;
    a library of standardized malicious code portions; and
    a detector portion reviewing the standardized version against the library of malicious code portions to provide an output indicating when a malicious code portion is present in the suspect program
    wherein the standardized version maps instructions of the suspect program to corresponding standard synonym instructions; and
    wherein the standard synonym instructions are different in number from the instructions of the suspect program to which the synonym instructions map.

2. The computer program of claim 1 wherein the standardized version identifies the execution order of instructions of the suspect program and wherein the detector portion reviews the instructions of the standardized version according to the execution order.

3. The computer program of claim 2 wherein the preprocessor identifies the execution order of the instructions by generation of a control-flow listing of the instructions.

4. The computer program of claim 1 wherein the standardized version removes irrelevant portions of the suspect program.

5. The computer program of claim 4 wherein the preprocessor removes irrelevant portions by identifying irrelevant portions to the detector so that the detector ignores identified irrelevant portions when reviewing the standardized version.

6. The computer program of claim 1 wherein the irrelevant portions are one or more nop instructions.

7. The computer program of claim 1 wherein the standardized version uses uninterpreted variables.

8. The computer program of claim 1 wherein the suspect program is a binary executable and wherein the preprocessor receives the binary executable to generate a listing of instructions and data values.

9. The computer program of claim 1 wherein the library of standardized malicious code provides instructions of the malicious code identified as to execution order.

10. The computer program of claim 1 wherein the library of standardized malicious code expresses instructions of the malicious code as standard synonym instructions.

11. The computer program of claim 1 wherein the library of standardized malicious code wherein the standardized version removes irrelevant program portions from the malicious code.

12. The computer program of claim 1 wherein the detector portion outputs a representation of the malicious portion when a malicious portion is present in the suspect program.

13. A computer program stored on a computer readable hardware storage medium for identifying malicious portions in a suspect computer program comprising:
    a preprocessor portion for receiving the suspect computer program and creating a logically equivalent standardized version of the suspect program without executing the suspect program;
    a library of standardized malicious code portions; and
    a detector portion reviewing the standardized version against the library of malicious code portions to provide an output indicating when a malicious code portion is present in the suspect program;
    the computer program further including a library of patterns matching to one or more instructions of the suspect program and wherein the preprocessor creates the standardized version by replacing instructions of the suspect program with matching patterns from the library of patterns and wherein the library of standardized malicious code portions are also patterns of the library of patterns wherein a pattern is at least one instruction logically replacing at least one different instruction in the suspect program.

14. A computer program stored on a computer readable hardware storage medium for identifying malicious portions in a suspect computer program comprising:
- a preprocessor portion for receiving the suspect computer program and creating a logically equivalent standardized version of the suspect program without executing the suspect program;
- a library of standardized malicious code portions; and
- a detector portion reviewing the standardized version against the library of malicious code portions to provide an output indicating when a malicious code portion is present in the suspect program;

the computer program further including a library of patterns matching to one or more instructions of the suspect program and wherein the preprocessor creates the standardized version by replacing instructions of the suspect program with matching patterns from the library of patterns and wherein the library of standardized malicious code portions are also collections of patterns from the library of patterns wherein a pattern is a tag replacing at least one instruction logically having no substantive effect on the execution of the suspect program; and wherein the library of patterns is implemented as a look-up table matching instructions to the patterns.

\* \* \* \* \*